Patented May 7, 1940

2,199,385

UNITED STATES PATENT OFFICE 2,199,385

COMPOSITION OF MATTER

Shailer L. Bass, Midland, Mich., assignor to The Dow Chemical Company, Midland, Mich., a corporation of Michigan No Drawing. Application December 14, 1937, Serial No. 179,743

3 Claims. (Cl. 134—79)

This invention relates to a composition of matter suitable for employment as a wetting liquid in air filters and the like.

In air filtering systems such as those employed in conjunction with heating apparatus and air conditioning systems, it is a practice to circulate the air, and at some point in the system to pass all air being circulated through a filter bed. Materials commonly employed for the manufacture of such air filters have comprised either cellulosic fiber aggregates, spun glass, glass wool or other fine siliceous fiber, mineral wool such as asbestos fiber, or metal wool such as steel wool, copper wool, lead wool, and the like. In order to augment the effectiveness of such fibrous filters, it has been the practice to coat the surface of the strands of solid material therein with a viscous liquid to which dust particles and other suspended matter being carried in the air stream will readily adhere. Among the liquids heretofore employed are heavy mineral oil fractions, and liquid organic phosphates, in particular tricresyl phosphate, which have been sprayed onto the fibrous aggregate prior to its employment as a filter bed. There are numerous disadvantages inherent in the use of mineral oils and other liquids which have heretofore been employed. For example, a cellulosic fiber aggregate which has been sprayed with mineral oil is too flammable for consideration where the filter is being used contiguous to a heating system. Similarly, the liquid organic phosphates such as tricresyl phosphate, due to their low viscosity, tend to flow off from the fibers, thus reducing the efficiency of the filter.

It is an object of the invention to provide a highly viscous sticky material which can be applied to a fibrous aggregate such as that employed in air filters, said sticky material having the property of causing dust particles and the like which may come in contact therewith to adhere thereto when a stream of air is drawn or blown through a filter body comprising such material. It is a further object of the invention to provide a material of the above-mentioned type which does not support combustion, and which is substantially odorless, tasteless, and non-toxic. It is a special object of the invention to provide a liquid composition suitable for use in air filters and the like which has a sufficiently high viscosity and low volatility at room temperature so that when applied to a filter bed, it will not be removed therefrom either by gravity or because of volatility, but which, by simple elevation of the temperature thereof, has a sufficiently depressed viscosity to be readily sprayed.

I have now found that the above-mentioned objects may be attained and the objections inherent in the employment of compounds such as the liquid organic phosphates alone may be overcome by employing as the filter coating liquid a composition comprising a viscous, non-flammable, non-hygroscopic organic liquid having a vapor pressure of less than 20 millimeters at 200° C., or having a boiling point above 300° C., and between about 0.5 and about 10 per cent by weight of an organic thermoplastic high molecular weight compound soluble in such liquid, and especially the organic derivatives of cellulose. Among the viscous non-flammable, non-hygroscopic organic liquids which may be employed in preparing the new compositions are the liquid organic phosphates. The high molecular weight organic thermoplastic compounds which may be employed include the cellulose ethers and cellulose esters. When the aforesaid viscous organic liquids are used to dissolve from about 0.5 to about 10 per cent of one of the organic thermoplastic compounds, the viscosity of the resulting solution is increased to a value such that the resulting liquid composition will not readily flow at room temperature and consequently would not be lost due to "run-off" from a filter bed to which it was applied. At the same time, these compositions are sufficiently fluid at elevated temperatures to permit their application to a fibrous aggregate by means of spraying or dipping. After the coating liquid has cooled, its tendency to flow at ordinary temperatures has been reduced to such an extent that no noticeable loss occurs even on long standing. Owing to the increased viscosity of the cooled composition, the filter bed fibers or strands are found to be coated with a very sticky material which readily retains dust particles and similar air-borne suspensions which may be brought into contact therewith.

I prefer to employ cellulose ethers, more especially ethyl cellulose. Benzyl cellulose may similarly be employed as may the cellulose esters such as cellulose acetate, cellulose acetate butyrate, and the like. The ethyl cellulose which I prefer to employ is one having an intrinsic viscosity of from ½ to 20 seconds, determined by the A. S. T. M. falling ball method at 25° C. on a solution containing 16 ounces of ethyl cellulose per gallon of solution, the solvent being composed of 80 parts of toluene and 20 parts of ethanol by volume. This corresponds to an ethyl cellulose having absolute viscosity in the range from 10 to 250 centipoises on a 5 per cent solution thereof by weight in the same solvent.

The following examples set forth one mode of preparation and give some of the properties of the new compositions:

Example 1

An ethyl cellulose was employed, 5 per cent solutions of which in 80 parts toluene and 20 parts of ethanol by volume had an absolute viscosity of 100 centipoises. This ethyl cellulose had an ethoxyl content of 49.1 per cent, i. e. slightly more than 2.5 ethoxyl groups per glucose unit. Solutions of the ethyl cellulose were prepared by dissolving 1, 2, and 3 per cent thereof in 2500-gram samples of diphenyl-mono-ortho-xenyl phosphate. The mixtures were agitated and heated at the rate of approximately 5 degrees per minute to a temperature of 160° C. This temperature was held for about 4 minutes to effect complete solution of the ethyl cellulose in the phosphate, after which the solution was allowed to cool to room temperature. Viscosity measurements and specific gravity determinations were made on samples removed from the mixture at the maximum temperature attained in the heating step, these measurements being made as the samples cooled. It was ascertained that the specific gravity of the ethyl cellulose-containing solution was the same at each temperature, as that of the phosphate itself at the same temperature. In the following table the viscosity measurements are recorded in terms of absolute viscosity in centipoises.

| Temperature, °C. | Material | | | |
|---|---|---|---|---|
| | Di-phenyl-mono-o-xenyl phosphate | Phosphate + 1% ethyl cellulose | Phosphate + 2% ethyl cellulose | Phosphate + 3% ethyl cellulose |
| 25 | 250 | 6560 | 120000 | |
| 50 | 66.2 | 271 | 1155 | 3380 |
| 75 | | 70.2 | 246 | 692 |
| 100 | 9.06 | 28.2 | 75.5 | 188 |
| 124 | 5.46 | 14.4 | 34.4 | 78 |

It is noted that the addition to the phosphate of small quantities of ethyl cellulose increased the viscosity of the cold solutions over that of the phosphate alone from 300 to 5000 per cent without, however, increasing the viscosity of the solutions at elevated temperatures beyond the range which may be satisfactorily employed as a spraying composition. The most satisfactory viscosity range for spraying purposes is from about 30 to about 80 centipoises. It is possible therefore to heat the ethyl cellulose in a liquid phosphate to a temperature between about 100° C. and about 175° C., and thereafter apply the composition to a filter bed, or the like, by spraying or dipping. When the composition has cooled to room temperature the viscosity thereof is so great that the coating is almost a gel and there is almost no tendency for it to flow from the surface on which it has been deposited. The new compositions had, at room temperature, a milky appearance but were, at elevated temperatures, substantially clear and readily sprayed. When cold the above compositions varied in consistency from thick liquids having a stickiness like that of molasses to viscous gels. To all of these compositions, dust and similar air-borne suspended matter readily adhered.

Example 2

In a manner similar to that described in the foregoing example, a medium viscosity benzyl cellulose was dissolved in di-ortho-xenyl-monophenyl phosphate to form a 2 per cent solution therein at 220° C. Slight discoloration occurred at this temperature but on cooling the composition was quite clear and had a materially increased viscosity over that of the phosphate alone.

Example 3

An ethyl cellulose of the same type as that employed in Example 1 was dissolved to form a 3 per cent solution in tri-beta-chloro-ethyl phosphate. The ethyl cellulose was nearly soluble at room temperature and complete solution was obtained at 110° C. No discoloration was observed and the composition remained clear even when cooled to room temperature. The viscosity of the phosphate was increased many-fold by the addition thereto of the ethyl cellulose.

Example 4

A medium viscosity cellulose acetate was dissolved to form a 3 per cent solution in tri-beta-chloro-ethyl phosphate. Complete solution occurred at room temperature, i. e. about 29° C., and the clear composition had a much higher viscosity than that of the phosphate alone.

Example 5

A medium viscosity cellulose acetate butyrate was dissolved at 210°–220° C. to form a 3 per cent solution in mono-phenyl-di-ortho-xenyl phosphate. No discoloration was observed and when the material cooled to room temperature the composition was somewhat milky. The viscosity of the composition was substantially greater than that of the phosphate alone at room temperature while at elevated temperature the material could readily be sprayed.

It was determined that at any given temperature the viscosity of organic phosphate solutions of cellulose derivatives varied directly as a straight line function of the eighth root of the absolute viscosity. It is therefore possible to predict the viscosity of any given concentration of a cellulose derivative in an organic phosphate at a particular temperature from previously determined viscosity of any two other concentrations of the same cellulose derivative in that phosphate at the same temperature.

The viscosity in centipoises at 25° C. of a number of viscous non-flammable organic liquids is given in the following table. In each instance the addition of a small amount of one of the thermoplastic organic compounds employed in the preceding examples results in a substantial increase in viscosity. Viscosity measurements here reported were made in a Gardner-Holdt bubble viscometer and converted to absolute units.

Di-phenyl-mono-ortho-xenyl phosphate___ 200
Mono-phenyl-di-ortho-xenyl phosphate___ 1,100
Tri-cresyl phosphate_____ 50

Solutions of ethyl cellulose and other cellulose derivatives have been prepared employing solvents of each of the types previously mentioned. In each instance there was a noticeable increase of the viscosity of the liquid after addition of the thermoplastic compound. The amount of thermoplastic solute required to produce a sufficiently viscous composition to be employed for the present purpose, i. e. having a viscosity above about 10,000 centipoises, was found to vary with the intrinsic viscosity of the particular thermoplastic material employed, the solubility thereof in the viscous solvents, and the effect of that solvent on solution viscosity. In some instances complete solution of the thermoplastic organic compound was not obtained even though the mixture was heated to as high as 250° C. In all cases, however, where substantial dispersion or solution of the high molecular weight thermoplastic organic compound was found to take place in the viscous organic liquid, the resulting compositions had the properties desired in a filter coating liquid, and in most cases a concentration of solute in the range from 0.5 to 10 per cent was ample to produce the desired result.

When the new compositions are heated so as to reduce the viscosity sufficiently to permit spraying, they are readily applied to filter beds and the like, and when sprayed lose sufficient of their heat before reaching the filter bed to result in the deposition thereon of thick, viscous coatings. This results in reducing the mean free path through which air or similar fluids may pass, and increases the effectiveness of the filter inversely as the variation of the square of the radius of said mean path. To illustrate, if the pore radius in a filter is reduced from 2 millimeters to 1 millimeter, the efficiency of the filter is increased four times.

The term "non-flammable liquid" herein employed refers to such liquids as will not support combustion. That is, even though the liquid may have a "flash point," it has no fire point." None of the liquids named support combustion.

Other modes of applying the principle of my invention may be employed instead of those explained, change being made as regards the materials employed, provided the ingredients stated by any of the following claims or the equivalent of such stated ingredients be employed.

I therefore particularly point out and distinctly claim as my invention:

1. A composition of matter, substantially free from components which are volatile at room temperature, consisting essentially of a liquid organic phosphate having a vapor pressure of less than 20 millimeters at 200° C., and as a thickening agent therefor from about 0.5 to 10 per cent of a cellulose derivative having only organic substituents dissolved in said phosphate, the amount of said organic derivative of cellulose being selected so that the composition is substantially permanently tacky and non-flowable at room temperature, the composition being adapted to use as a coating for air-filters.

2. A composition of matter, substantially free from components which are volatile at room temperature, consisting essentially of a liquid organic phosphate having a vapor pressure of less than 20 millimeters at 200° C., and as a thickening agent therefor from about 0.5 to 10 per cent of a cellulose ether dissolved in said phosphate, the amount of said cellulose ether being selected so that the composition is substantially permanently tacky and non-flowable at room temperature, the composition being adapted to use as a coating for air-filters.

3. A composition of matter, substantially free from components which are volatile at room temperature, consisting essentially of a liquid organic phosphate having a vapor pressure of less than 20 millimeters at 200° C., and as a thickening agent therefor from about 0.5 to 10 per cent of ethyl cellulose dissolved in said phosphate, the amount of said ethyl cellulose being selected so that the composition is substantially permanently tacky and non-flowable at room temperature, the composition being adapted to use as a coating for air-filters.

SHAILER L. BASS.